Patented July 1, 1941

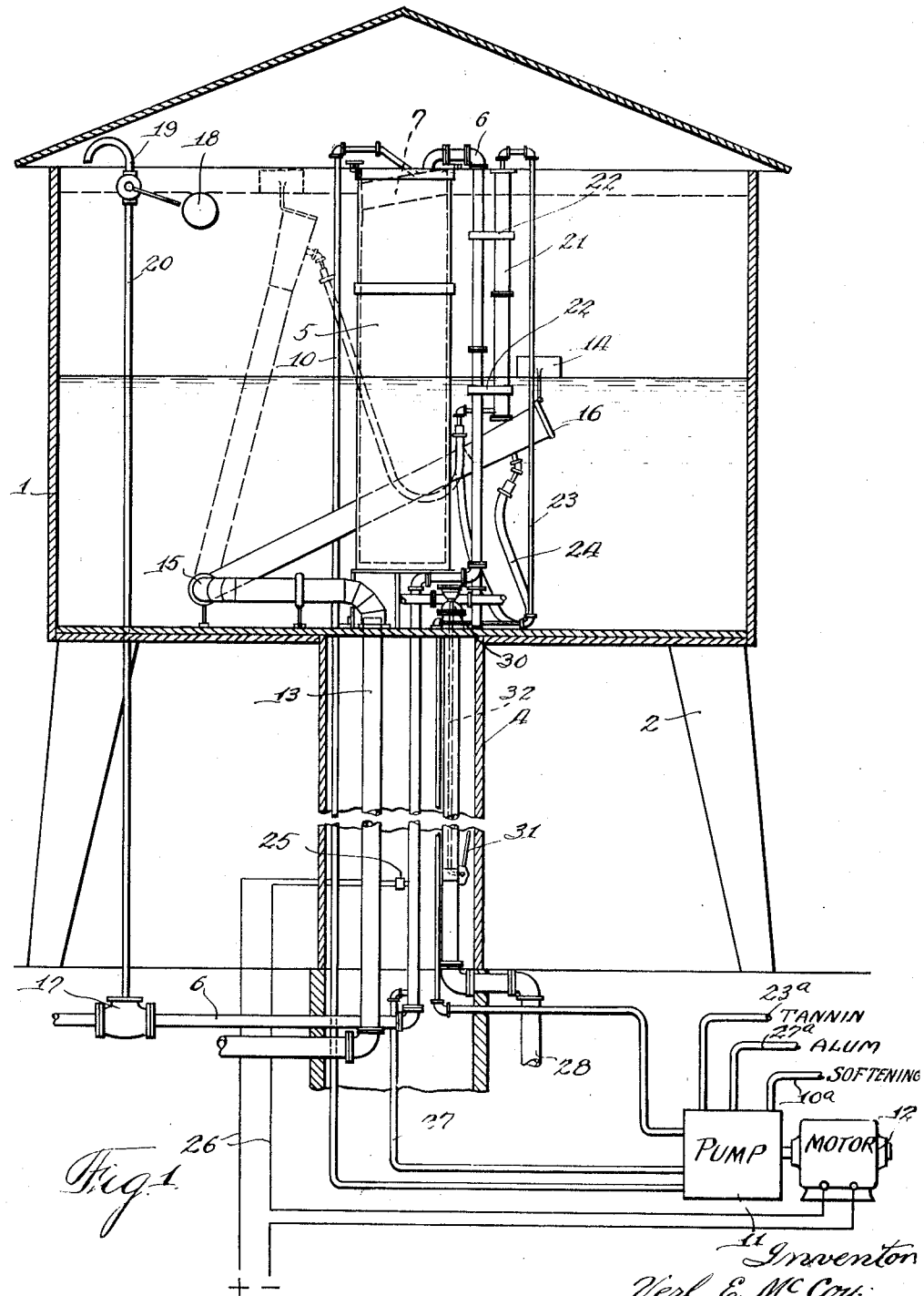

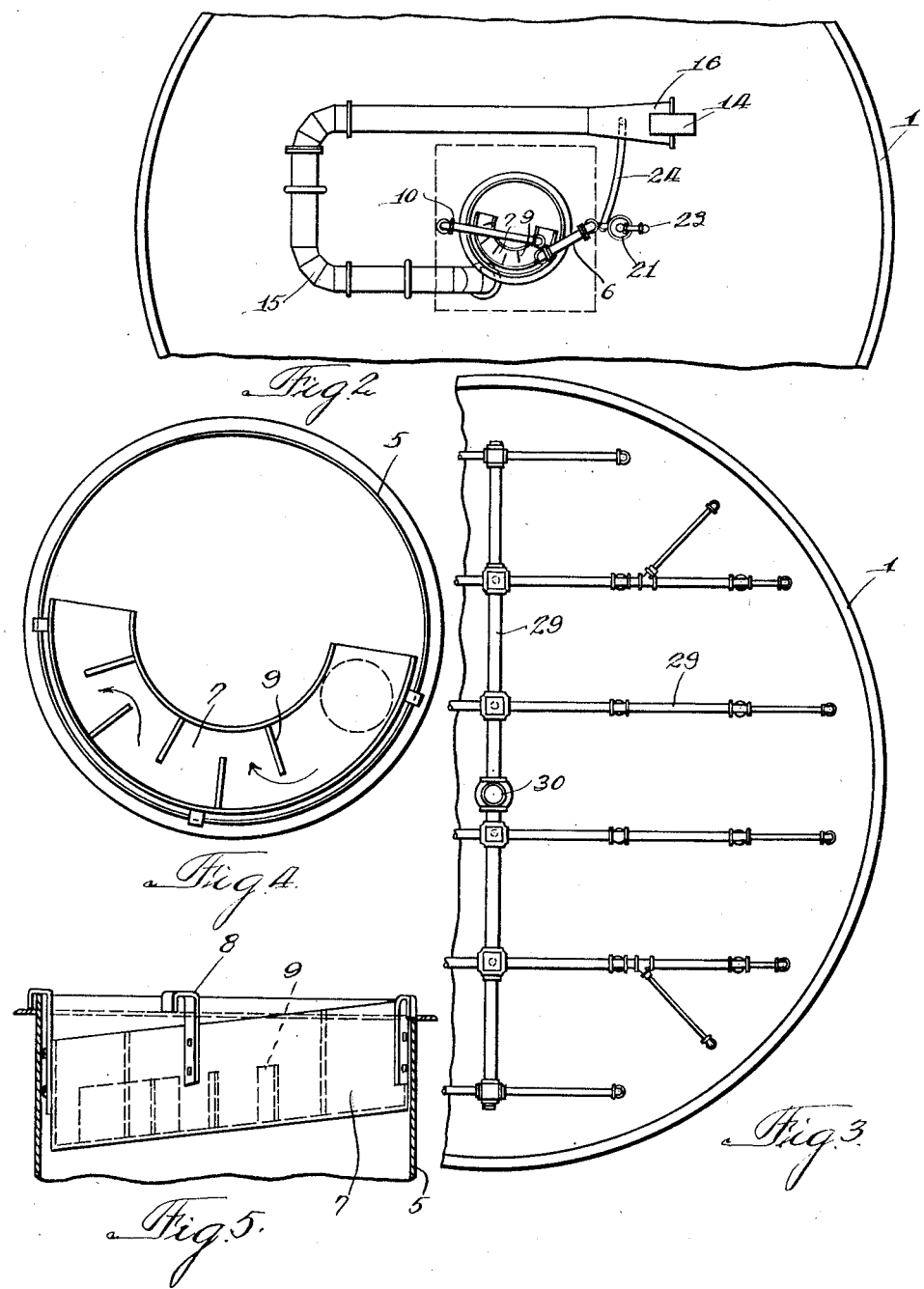

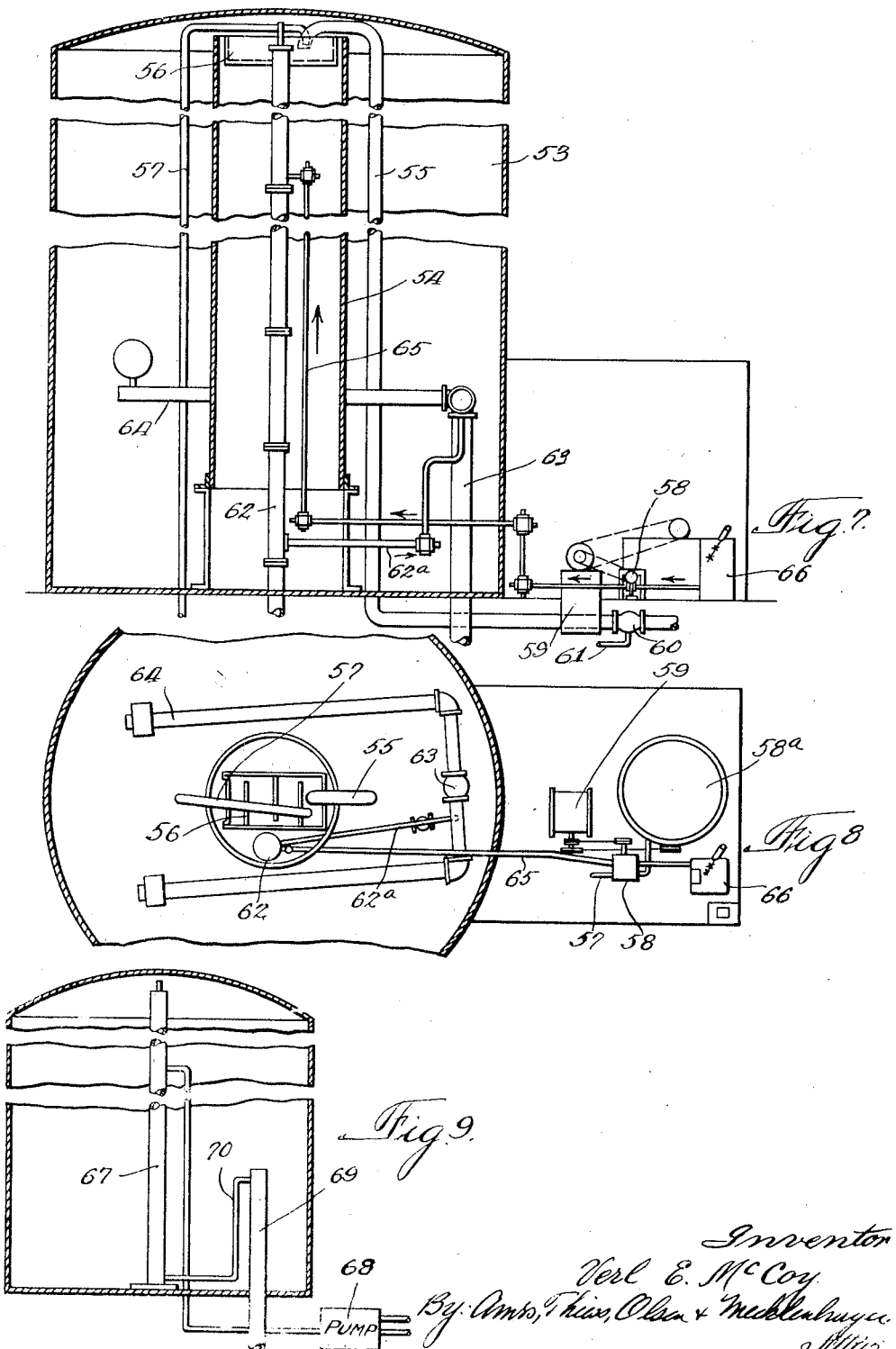

2,247,762

UNITED STATES PATENT OFFICE 2,247,762

WATER TREATMENT MEANS AND METHOD

Verl E. McCoy, La Grange, Ill.

Application February 27, 1939, Serial No. 258,691

15 Claims. (Cl. 210—10)

This invention relates to means and method for water treatment and more particularly to a method and apparatus for automatically proportioning liquids in accordance with definite predetermined volume ratios and is adaptable for either external or internal treatment.

It is desirable to treat hard water that is to be used in boilers and the like with certain softening agents such as lime, soda, and sodium aluminate. It has been the general practice in external treatment to introduce the softening agent into the water in a storage tank and mix it therein preliminary to use. When hard waters are treated in this manner, considerable quantities of a flocculent precipitate are formed within the storage tank. The precipitation reaction does not go to completion at once and oftentimes the precipitate is still in the process of formation at the time when the water within the storage tank is withdrawn for use.

It is desirable, therefore, to add a second chemical to the treated water in order to prevent further precipitation from the solution. This second chemical is usually an aqueous solution of complex organic compounds such as tannins and the like. In order to obtain maximum effect in preventing after-precipitation in the treated water, it is desirable that a predetermined percentage of the tannin solution be fed into the water withdrawn for use in exact proportion to the volume of water withdrawn irrespective of the rate of withdrawal, which rate may, in practice, vary from a minimum to 3,500 gallons per minute or more. It is also desirable to add the tannin solution to the water after it leaves the treating tank so that precipitation is prevented after the water leaves the tank but is not inhibited within the tank itself.

It is, therefore, one object of the invention to provide a method and apparatus for automatically treating softened water as it is withdrawn from a reservoir to thereby prevent delayed reaction or after-precipitation.

A further important object is to provide an automatically operating, accurately proportioning, secondary treatment for widely varying rates of outflow from a tank and in which the necessary equipment may be comparatively inexpensive and may easily and quickly be installed and will not easily get out of order under varying conditions of installation; also in which expensive proportioning devices may be eliminated and the invention may easily and cheaply be incorporated in either new or old installations of various types and capacities.

A further object of this invention is the provision of a proportioning system which is particularly useful for railroad equipment or similar installations and is capable of discharging large quantities of chemically treated water into locomotive tenders and the like at a rapid rate and at the same time maintain pure water in the tank which may also be used in small quantities for drinking and other purposes without materially interfering with the chemical proportioning of the main outflow. For instance, a primary softening chemical need not be used in the tank, but instead a solution comprising a softening agent and a precipitation inhibiting agent may be injected into the pure water as it is withdrawn from the tank. The chemical may be of such nature that no precipitation occurs in the pipe lines. Instead the reactions all take place in the boilers into which the water is fed. This is commonly called internal treatment and differentiates from the external treatment previously mentioned in which the precipitation takes place in the storage tank and a finishing treatment is required.

It is an object of the invention to provide a method and means for accurately proportioning chemical treatment of water flowing from a tank or reservoir by automatically proportioning a chemical solution in volumetric relationship to the inflow of water to the tank and automatically delivering the proportioned chemical into the water flowing from the tank in predetermined volumetric relationship thereto irrespective of the rate of withdrawal of water from the tank.

In practicing this invention, a so-called equalizing chamber is provided for the chemical solution and is associated with the tank or reservoir, and may be positioned either inside or outside the tank in accordance with the requirements of particular installations. The liquid level of any desired chemical solution in this equalizing chamber automatically is maintained in a substantially constant relationship to the water level in the tank irrespective of variations therein, although the exact liquid level relationship will depend somewhat upon the relative densities of the liquids. In any event, an accurate relationship is maintained preferably under control of the inflow of water to the tank and in response to withdrawal therefrom, and the chemical solution from the equalizing chamber is directed into the outflowing water in exact volumetric ratio to the water withdrawn irrespective of the ratio of withdrawal.

Tanks and reservoirs are of various shapes and capacities. However, the equalizing chamber associated with any particular tank or with communicating tanks in which a common water level is maintained, is so proportioned relative to the tank or tanks that one inch of chemical solution in the equalizing chamber at any level will treat one inch of water in the tank or tanks at a corresponding level. If the water level is rising, the chemical solution will rise in exact accordance therewith. As water is drawn from the storage tank, the chemical solution automatically is withdrawn from the equalizing chamber and injected into the outflowing water in exact accordance with the draw-down from the storage space. Any rate of outflow from the storage tank is, therefore, properly treated irrespective of the rate of inflow to the tank which may be taking place at the same time.

Further objects will be apparent from the specification and the appended claims.

In the drawings:

Fig. 1 is a vertical sectional view of one type of storage tank and one embodiment of the proportioning system incorporated therewith, and which is arranged for so-called external treatment.

Fig. 2 is a fragmentary top view of the tank assembly illustrated in Fig. 1.

Fig. 3 is a transverse sectional view through the tank and illustrates the distribution of the sludge outlet conduits which are positioned adjacent the bottom of the tank.

Fig. 4 is a top view of the downcomer shown in Fig. 1 with the mixing trough supported therein.

Fig. 5 is a side elevation of the mixing trough shown in Fig. 4 with a portion of the downcomer shown in section.

Fig. 7 is a somewhat diagrammatic view of a slightly different type of installation which is arranged for external treatment.

Fig. 8 is a top view of the embodiment illustrated in Fig. 7.

Fig. 9 is a diagrammatic view illustrating an installation similar to that shown in Figs. 7 and 8 after it has been changed to provide a proportioning arrangement adapted for internal treatment.

Figure 6:
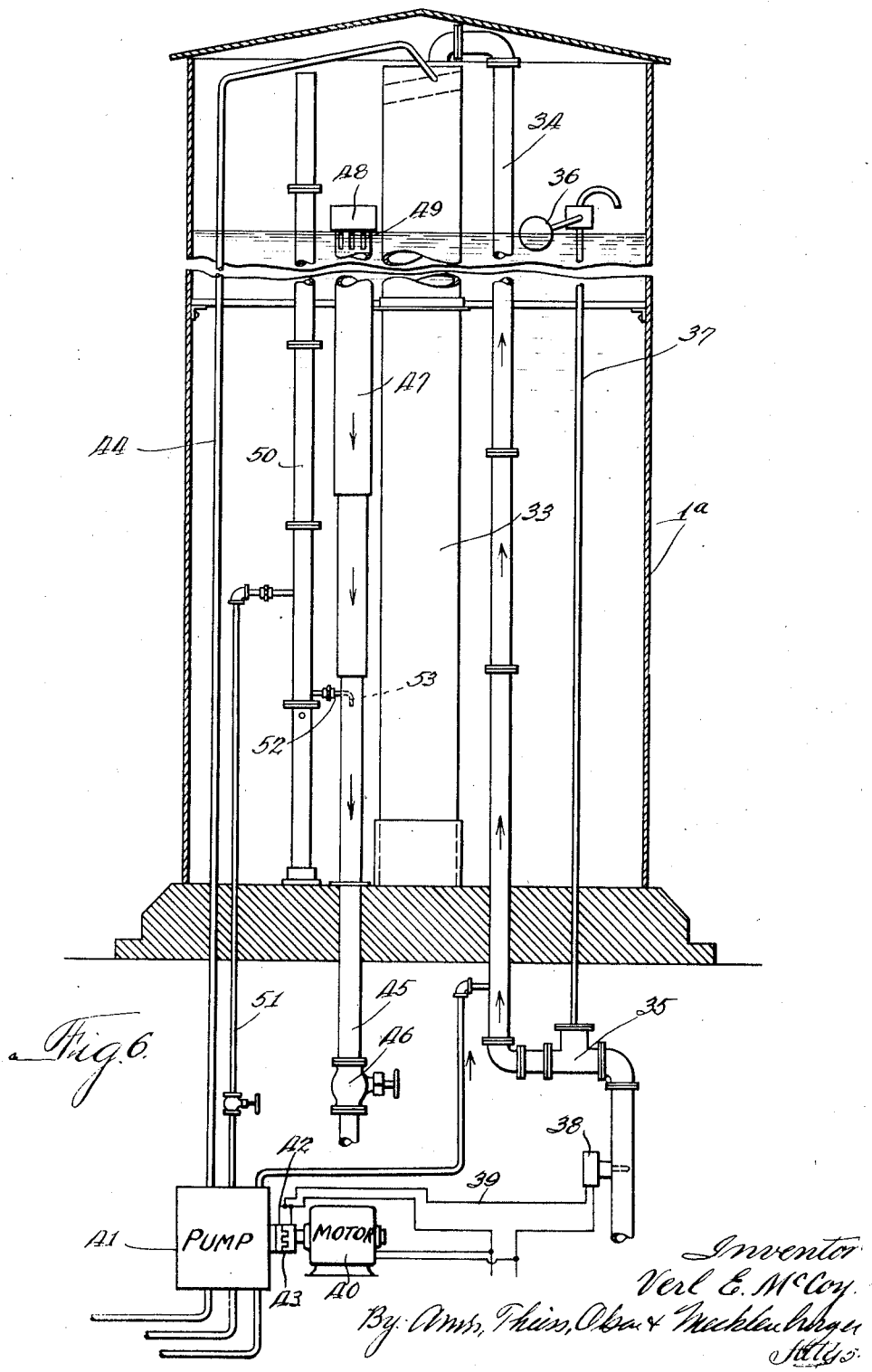
Fig. 6 is a vertical sectional view through a somewhat different type of tank and illustrates another embodiment of the invention which is also arranged for so-called external treatment.

Referring to the drawings in detail, the embodiment illustrated in Figs. 1 to 5, inclusive, comprises a water storage tank 1 to which the invention has been applied for the purpose of so-called external treatment. In external treatment the scale forming solids are actually removed from the water in the treating tank before it is discharged therefrom to the boiler. This distinguishes from a so-called internal treatment for which the invention is also adapted and wherein no solids are removed externally of the boiler. In internal treatment the chemical is carried into the boiler with the water, and, under conditions of temperature and pressure existing in the boiler, the chemical reaction is completed and reaction takes place. It will be understood that various types of water treating agents may be used for various purposes, the various agents and solutions referred to herein being merely illustrative.

In one form of external treatment, a water softening chemical solution such as lime-soda-sodium aluminate solution is injected into the water in the tank, where it is thoroughly mixed and precipitation takes place. As the water is withdrawn from the tank for use, a precipitation inhibiting chemical solution such as a tannin solution is injected into the conduit leading from the tank, and, therefore, after-precipitation is inhibited until the water is heated in the locomotive boiler.

The invention is also applicable for water treatment wherein a primary softening chemical solution of a type which is non-precipitating when cold is fed into the conduit leading from the tank and no chemical whatever need be fed into the tank itself. This is a so-called internal treatment and enables pure water to be withdrawn in small quantities from the tank through a separate conduit for drinking or other purposes and yet enables proper treatment of the water in the locomotive boiler.

Various types of installations may be used to conform with local requirements. In the embodiment illustrated in Figs. 1 to 5, the tank 1 may be supported on suitable legs 2 and provided with the usual frost box 4, through which all of the conduits may pass to and from the tank. The tank may be provided with the usual so-called downcomer 5, and a water inlet conduit 6 extends upwardly through the frost box and is arranged to discharge the incoming water into a suitable mixing trough 7 (Figs. 4 and 5), which trough is supported adjacent the top of the downcomer by means of suitable hooks 8, as shown. The mixing trough 7 is angularly positioned in the downcover and the water inlet 6 discharges into the raised end thereof so that the incoming water flows downwardly past baffle members 9. A conduit 10 is provided for directing a softening solution into the tank and this conduit is arranged to discharge a water softening chemical solution into the raised end of the mixing trough 7 substantially simultaneously with the incoming water. The water and chemical flow downwardly through the mixing trough and through the downcomer into the tank and are thereby thoroughly mixed with the water. The water softening solution may be pumped through the conduit 10 from a suitable vat by means of a proportioning pump 11 which may be operated by means of an electric motor 12. The softening solution may be directed to the pump through a conduit 10a leading from the vat.

The proportioning pump 11 may be of any suitable type, but is preferably of the type illustrated in my copending application Serial No. 259,519, filed March 3, 1939, in which a plurality of positive displacement units are used and may accurately be controlled for pumping a plurality of solutions in any desired ratio within the limits of pump adjustment. The tank 1 is also provided with an outlet conduit 13 having a floating outlet member 16 comprising an elongated conduit portion hinged at 15 and having its free end provided with a float 14, whereby the outlet opening is always adjacent the water level in the tank.

The inlet pipe 6 is provided with a quick opening and quick closing hydraulic valve 17 which may be of a type well known in the art and which is controlled by variations in the water level by means of a float 18 in the tank, which float controls a valve 19 in a conduit 20 leading from the inlet valve 17. The hydraulic valve 17 is preferably of the non-throttling type operated by the pressure of the liquid in the pipe line 6 when the float 18 opens the valve 19. These hydraulic valves and this type of control are well known in the art and further description is believed unnecessary. If desired, the float 18 may be arranged to electrically control a motorized valve instead of the hydraulically controlled valve 17.

In order to proportionally inject a precipitation inhibiting chemical solution such as a tannin solution into the outlet from the tank in exact ratio to the volume of water withdrawn from the tank, a so-called equalizing chamber 21 is positioned relative to the normal water level in the tank substantially as shown in Fig. 1. In this embodiment the equalizing chamber is an elongated tubular reservoir extending somewhat above the normal water level in the tank. It may be supported on the inlet pipe 6 by means of brackets 22, if desired. However, it should be understood that this equalizing chamber may be of any suitable type and may be positioned in any suitable place either within the tank or outside thereof, but in either case should extend above and below the normal water level in the tank and be of sufficient capacity for local requirements.

A conduit 23 leads from the proportional pump 11 and discharges into the top of the equalizing chamber 21. This conduit 23 receives its input from the pump 11 and communicates therethrough with a chemical solution vat through a conduit 23a. The equalizing chamber 21 communicates with the floating outlet 16 by means of a flexible conduit 24, and the inlet of this conduit 24 is preferably closely adjacent the open end of the floating outlet 16.

The water inlet conduit 6 is provided with a flow switch 25 which controls an electric circuit comprising conductors 26 which are provided for controlling the motor 12 for operating the proportional pump. The flow switch 25 may be of any of the usual types wherein flow through the inlet pipe closes the switch to thereby operate the motor and pump associated therewith.

If desired, the motor 12 may be started and stopped by means of the flow switch in accordance with the flow of water in the conduit 6. However, in the proportional pump disclosed in the copending application previously referred to, the motor may be either continuously or intermittently operated and a solenoid is arranged to operate a suitable clutch to thereby connect the motor with the pump in response to the operation of a suitable meter in the conduit and operatively connected to circuit controlling relays. However, the control circuit may be modified to operate from a flow switch if desired.

In some cases it is desired to inject a separate chemical such as an alum solution into the incoming water. For this purpose, a conduit 27 communicates through the proportional pump 11 and a conduit 27a with a suitable solution vat. The conduit 27 communicates with the water inlet conduit 6 as shown, whereby, whenever the pump is in operation, the alum solution may be pumped into the inlet pipe together with the incoming water in any desired ratio.

It will be apparent that, as the inflow of chemical to the equalizing chamber 21 is simultaneous with the inflow of water to the tank, and, as the proportional pump 11 is controlled by the flow switch 25 in the water inlet conduit, the liquid level of the chemical solution in the equalizing chamber will always substantially correspond to the water level in the tank, the only difference being in the case of different relative densities of the chemical and water.

The operation of the device is as follows, assuming that the tank and equalizing chamber are filled to the normal liquid level. When water is withdrawn from the outlet conduit 13, an exact predetermined ratio of chemical solution will flow from the equalizing chamber 21 into the outlet conduit through the flexible conduit 24 and be withdrawn with the water. This relative outflow of water and chemical will continue in exact predetermined ratio irrespective of the rate of outflow, and the proportionate withdrawal of chemical and water will remain constant. As soon as the water level in the tank drops sufficiently to lower the float 18, the control conduit 20 will be opened and the water inlet control valve 17 will simultaneously be opened to its full extent to allow water to pass into the tank through the downcomer 5. As soon as flow starts through the inlet pipe 6, the flow switch 25 will close to thereby start the proportional pump 11 and chemical solution will be pumped through the conduit 23 into the equalizing chamber 21 in exact proportion to the water inflow through the conduit 6.

The water level in Fig. 1 in the tank is shown very low. However, ordinarily the water level would remain substantially as shown by the dotted line except when water was drawn from the tank very rapidly. Simultaneously with the above-mentioned operations, an alum solution may, if desired, be pumped through the conduit 27 and into the inlet pipe 6 in any desired proportion to the inflowing water. However, the conduit 27 is not essential in the operation of the invention and may be dispensed with where it is not desired to pump any chemical into the inflowing water. As previously stated, the equalizing chamber is so proportioned throughout its length that one inch of chemical at any level therein will treat an inch of water at a corresponding level in the tank. In cases where the tanks are not cylindrical, the equalizing chambers are shaped accordingly, so that the proportionate relationship exists throughout the height of the equalizing chamber.

With the construction just described, if the water level within the storage chamber is rising, the chemical will rise in the equalizing chamber in exact accordance with the rise of the water. Also, as the water flows out of the storage tank, the chemical will be fed from the equalizing chamber into the outflowing water in exact accordance with the draw-down from the tank. By this means, any rate of outflow from the storage space receives an exact predetermined chemical treatment regardless of the rate of inflow which may occur at the same time.

A sludge outlet conduit 28 extends through the frost box 4 and into the tank 1, where it is provided with branch conduits 29, as shown in Fig. 3. The sludge conduit 28 is provided, within the tank, with a valve 30 which is controlled from outside the tank by means of a handle 31 connected to the valve 30 by means of an elongated link 32. By this means, sludge may be withdrawn from the tank from time to time, as required.

Fig. 6 illustrates a slightly modified embodiment in which the proportioning control is adapted for a somewhat different type of water tank installation. In this embodiment, the tank 1a is provided with a suitable downcomer 33, into the upper end of which an inlet conduit 34 discharges in the same manner as previously described. This inlet 34 is provided with a float controlled inlet valve 35 of the quick acting type and is controlled by means of a float 36, which, in turn, controls a valved conduit 37. By this means the water level in the tank is maintained in the same manner as previously described. The water inlet conduit 34 is provided with a flow switch 38 therein for controlling a clutch operating electrical circuit 39. In this embodiment, a continuously operating motor 40 may be provided for operating a proportioning pump 41, which pump may be of any suitable type, preferably similar to that previously referred to, with a control circuit modified to conform with the particular installation.

The flow switch 38 controls a solenoid 42, which, in turn, controls the operation of a clutch 43 in the transmission between the motor and the proportional pump 41. Therefore, the proportional pump will be operated simultaneously with any inflow of water to the tank. A conduit 44 is arranged to discharge a suitable water softening chemical into the top of the downcomer 33 whenever the proportional pump is operated. This chemical may be delivered to the pump from any suitable chemical vat. The water tank 1a is provided with a discharge outlet conduit 45 which may have a valve 46 therein. This outlet conduit 45 extends upwardly into the tank and is provided at its upper end with a suitable telescopic portion or portions 47, the upper one of which is provided with a float 48 and openings 49 adjacent the float.

An elongated equalizing chamber 50 is provided and a conduit 51 leads from the pump to the equalizing chamber, as shown, whereby a suitable chemical may be pumped from a vat into the equalizing chamber simultaneously with the inflow of water and in a predetermined ratio. A conduit 52 communicates between the equalizing chamber 50 and the fixed part of the water outlet conduit 45. The connecting conduit 52 extends into the outlet pipe 45 and, when the device is arranged to use a chemical solution in the equalizing chamber which is of less density than the water, the nozzle within the outlet conduit is turned downwardly as shown by dotted lines at 53. Conversely, when the chemical solution within the equalizing chamber is of greater density than the water, the nozzle may be turned upwardly. This prevents mixing of chemical and water except during actual outflow through the conduit 45.

Figs. 7 and 8 illustrate an embodiment in which the proportioning device is installed in connection with a previously installed water tank. The embodiment comprises a water tank or reservoir 53 in which is positioned the usual downcomer 54. A water inlet conduit 55 is arranged to discharge the incoming water into a mixing box 56 positioned at the top of the downcomer. A conduit 57 is provided for directing incoming water-softening chemical solution into the mixing box 56, and this water-softening conduit may be connected to a positive displacement proportioning pump 58. The water-softening chemical is pumped through the proportioning pump 58 from a chemical vat 58a, and the pump 58 may be of a type similar to that previously described whereby a plurality of chemicals may be pumped in any desired ratio. In the present embodiment, the pump 58 is operated by means of a positive displacement water motor 59, and this water motor is in the water inlet line to the tank and operates in accordance with the volume flow to properly proportion all chemical flow from the pump. The water inlet pipe 55 is provided with a float controlled valve 60 having a control conduit 61 which is in turn controlled by a suitable float such as previously described to maintain a predetermined water level in the tank. The control is such that the proportional pump 58 operates only when water is flowing through the inlet pipe 55, and this operation may correspond exactly with the pump control used in connection with the previously described embodiments. The water motor may simultaneously operate suitable agitators in the solution vats by means of belts and pulleys, as shown, or other suitable transmission.

In these embodiments shown in Figs. 7 and 8, an equalizing chamber 62 is provided which comprises a comparatively small diameter stand pipe extending above the water level in the tank whereby the surface levels in the tank and in the equalizing chamber will correspond in a predetermined area ratio at any common level. The tank is provided with an outlet conduit 63 having a floating outlet device 64 connected thereto so that the outlet opening is always adjacent the water level. The equalizing chamber 62 communicates from adjacent its bottom end with the water outlet by means of a restricted conduit 62a, and a restricted conduit 65 leads from a chemical vat 66 through the proportional pump 58 to the equalizing chamber 62 at a point well above the equalizing chamber outlet.

Fig. 9 illustrates an installation for internal treatment as applied to a tank installation similar to that shown in Figs. 7 and 8. In this embodiment the downcomer and mixing tank and floating outlet may be dispensed with, as a softening chemical is not introduced into the tank itself. In this embodiment an equalizing chamber 67 may be provided which may be substantially identical with the equalizing chamber 62 previously described and which is connected to receive a solution comprising a softening agent and a precipitation inhibiting agent from suitable vats through a pump 58, the pump being controlled from the water inlet in the same manner as previously described. A water inlet is not shown in this view. However, any suitable inlet may be provided, and a downcomer and mixing trough are unnecessary, as no chemical is mixed with the water in the tank.

The outlet from the tank comprises a raised outlet conduit 69, and a restricted conduit 70 is provided between the equalizing chamber 67 and the outlet 69 whereby the chemical solution, including the softening agent and a precipitation inhibiting agent from the equalizing chamber 67, is directed into the outlet pipe 69 during the outflow of water therefrom. The controls in this arrangement may be similar to the controls previously described.

In the embodiments described herein, water and chemical solution are withdrawn simultaneously from the tank and equalizing chamber, respectively, and both are discharged into the same outlet conduit in a predetermined constant ratio irrespective of rate of withdrawal and irrespective of the rate of inflow to the tank and equalizing chamber.

If the water inflow rate is constant, a positive displacement constant speed pump may be used for the chemical solution. If the water inflow rate is variable, a proportional pumping equipment and control is used to maintain a predetermined ratio of inflow of chemical solution to inflow of water.

It will, of course, be obvious that modifications may be made in the embodiments illustrated and described herein, and it is desired, therefore, that the invention be limited only by the prior art and the scope of the appended claims.

Having thus described this invention, what is claimed and desired to be secured by Letters Patent is:

1. A water treatment method comprising continuously maintaining a supply of water and a supply of chemical solution at corresponding levels and with a predetermined surface area ratio at any common level by intermittent simultaneous renewal of both supplies in proportional amounts in response to withdrawal, withdrawing water from said water supply at a variable rate, and draining said chemical solutiton by gravity from said solution supply into the outflowing water in a predetermined volumetric ratio corresponding to said surface area ratio irrespective of the rate of outflow.

2. A water treatment method comprising maintaining a supply of water and a supply of chemical solution at corresponding levels and with a predetermined surface area ratio at any common level by simultaneous renewal in response to withdrawal and at a volumetric renewal ratio corresponding to the surface area ratio, withdrawing water from said water supply and simultaneously injecting said chemical solution into the outflowing water in a volumetric ratio corresponding to the said surface are a ratio.

3. A method of external treatment comprising maintaining a supply of softener treated water and a supply of precipitation inhibiting solution at corresponding levels irrespective of rate or volume of withdrawal and with corresponding surface areas at any common level, simultaneously renewing both supplies in response to withdrawal, withdrawing softener treated water at a variable rate, and draining said precipitation inhibiting solution into the outflowing water in predetermined constant volumetric ratio irrespective of inflow and irrespective of the rate of outflow.

4. A method of internal treatment comprising maintaining a supply of water and a supply of chemical solution at substantially a common variable level by simultaneous renewal of both supplies in response to withdrawal, said chemical solution comprising a water softening agent and a precipitation inhibiting agent, withdrawing water and solution from said supplies at a variable rate, and draining said chemical solution into the outflowing water in a predetermined volumetric ratio to maintain said common variable level irrespective of the rate of outflow.

5. In a water treatment art, a process for mixing two liquids which comprises discharging one of said liquids by gravity in a stream from a supply, simultaneously discharging the other of said liquids by gravity into said stream from a supply, said discharge rates being related to maintain the pressure heads of both liquids substantially equal above the point of discharge irrespective of the total discharge rate.

6. A process for treating water with a predetermined amount of chemical solution which comprises discharging water at a substantially constant rate into a storage tank, simultaneously discharging the solution into a storage chamber at a rate corresponding to the volume ratio of water and solution ultimately desired, controlling the flow of water and solution into said tank and container whereby the water level in said tank is maintained between predetermined limits, discharging the water in a stream from the storage tank, simultaneously discharging the solution into said stream from the storage chamber, the discharge rates being related to maintain the pressure heads of said water and said solution substantially equal above the point of discharge irrespective of the total discharge rate and the total inflow rate.

7. A process for softening water and subsequently preventing delayed precipitation therein which comprises introducing water into a storage tank, introducing a water softening agent into the tank at the same time, mixing said water softening agent and said water whereby a precipitate is formed, introducing a precipitation inhibiting agent into a storage chamber simultaneous to the introduction of water and water softening agent into the tank and at a rate corresponding to the volume ratio of softened water and inhibiting agent ultimately desired, controlling the flow of water and softening agent into said tank in response to fluctuations from a predetermined liquid level to normally maintain said level, discharging the softened water in a stream from the storage tank, simultaneously discharging the precipitation inhibiting agent into said stream from said storage chamber, the discharge rates being related to maintain the pressure heads of said water and said precipitation inhibiting agent substantially equal above the point of discharge irrespective of variations in liquid level, liquid inflow, or liquid outflow.

8. In a water-treating system, a water container having an inlet and an outlet, a chemical solution container having an inlet and having an outlet communicating with said water outlet, means controlled by the liquid level in one of said containers for controlling the rate of simultaneous inflow to both containers in a predetermined ratio, said outlets being related to maintain the outflow of water and chemical solution at said predetermined ratio.

9. In a water-treating apparatus, the combination with a water tank having a water inlet and an outlet, of a solution tank having an outlet communicating with said water tank through the water tank outlet to maintain a liquid balance between said tanks irrespective of rate of withdrawal and means for automatically injecting water and solution to the respective tanks simultaneously in a ratio corresponding to the withdrawal ratio.

10. In a water-treating apparatus, the combination with a water tank having a floating outlet, of a solution tank having an outlet communicating with said floating outlet to maintain a liquid balance between said tanks irrespective of rate of withdrawal through said common floating outlet, and means for automatically injecting water and solution to the respective tanks simultaneously in response to withdrawal and in a ratio corresponding to the withdrawal ratio.

11. A proportioning apparatus comprising a water storage tank having an inlet and a discharge outlet, a chemical solution tank having an inlet and a discharge outlet and being volumetrically proportional throughout its operative length with said water tank, the discharge from said water outlet and from said solution outlet being directed into a common outflow conduit in the same proportions as the said volumetric relationship of said tanks, means controlled by the liquid level for controlling the water inflow, and means controlled by the water inflow to control the chemical solution inflow.

12. A proportioning apparatus comprising a water storage tank having an inlet and a discharge outlet, a chemical solution tank having an inlet and a discharge outlet and being volumetrically proportional throughout its operative length with said water tank, a common outflow conduit, said water outlet and said solution outlet being positioned and related to independently direct their respective outflow into said common outflow conduit and in the same proportions as the said volumetric relationship of said tanks, means controlled by the liquid level for controlling the water inflow, means controlled by the water inflow to control the chemical solution inflow, means for directing a water softening solution into said water tank, and means controlled by the water inflow to control the inflow of both the said chemical solution and the water softening solution.

13. A proportioning apparatus comprising a water storage tank having an inlet and a discharge outlet, a chemical solution tank having an inlet and a discharge outlet and being volumetrically proportional throughout its operative length with said water tank, a common outflow, conduit, said water outlet and said solution outlet being positioned and related to independently direct their respective outflow into said common outflow conduit and in the same proportions as the said volumetric relationship of said tanks, means controlled by the liquid level for controlling the water inflow, means controlled by the water inflow to control the chemical solution inflow, means for directing a water softening solution into said water tank, a proportional pump, and means operable by the water inflow to control said pump to proportion the inflow of said chemical solution and said softener solution in predetermined ratio to said water inflow.

14. A proportioning apparatus comprising a water storage tank having a water inlet, a softener solution inlet and a discharge outlet, a comparatively small equalizing chamber of a unit capacity relatively corresponding to the unit capacity of said water tank over its operative length including the normal liquid level, means controlled by the liquid level for intermittently causing a uniform rate of water inflow, a proportional pump, means controlled by the water inflow to intermittently cause said pump to inject a chemical solution into said tank and a second chemical solution into said equalizing chamber at uniform rates and proportional to the water flow to maintain corresponding levels in said tank and equalizing chamber, and a conduit for directing solution by gravity from said equalizing chamber into said water discharge outlet in a ratio corresponding to the unit capacity ratio of said equalizing chamber and said water tank.

15. In a water-treating system, a water container having an inlet and an outlet, a chemical solution container having an inlet and also having an outlet communicating with said water outlet, means controlled by the liquid level in one of said containers for controlling the rate of simultaneous inflow to both containers in a predetermined ratio, said outlets being related to maintain the outflow of water and chemical solution at said predetermined inflow ratio, a motor-operated means to pump chemical solution into said solution container in said predetermined ratio to the inflow of water, and a flow switch in the water inlet to control said motor in response to water flow.

VERL E. McCOY.